United States Patent
Geen

(10) Patent No.: US 9,207,081 B2
(45) Date of Patent: Dec. 8, 2015

(54) ELECTRODE ARRANGEMENTS FOR QUADRATURE SUPPRESSION IN INERTIAL SENSORS

(71) Applicant: Analog Devices, Inc., Norwood, MA (US)

(72) Inventor: John A. Geen, Tewksbury, MA (US)

(73) Assignee: Analog Devices, Inc., Norwood, MA (US)

( * ) Notice: Subject to any disclaimer, the term of this patent is extended or adjusted under 35 U.S.C. 154(b) by 138 days.

(21) Appl. No.: 14/098,781

(22) Filed: Dec. 6, 2013

(65) Prior Publication Data

US 2014/0102195 A1    Apr. 17, 2014

Related U.S. Application Data

(62) Division of application No. 13/442,010, filed on Apr. 9, 2012, now Pat. No. 8,616,055, which is a division of application No. 12/469,899, filed on May 21, 2009, now Pat. No. 8,151,641.

(51) Int. Cl.
    *G01P 9/04*        (2006.01)
    *G01C 19/5719*     (2012.01)
    *G01C 19/5776*     (2012.01)
    *G01C 19/56*       (2012.01)

(52) U.S. Cl.
    CPC ........... *G01C 19/5719* (2013.01); *G01C 19/56* (2013.01); *G01C 19/5776* (2013.01)

(58) Field of Classification Search
    CPC ...................................................... G01P 9/04
    USPC ........... 73/1.38, 504.12, 504.13, 504.14, 509, 73/510, 514.01, 514.02
    See application file for complete search history.

(56) References Cited

U.S. PATENT DOCUMENTS

| 2,309,853 A | 2/1943 | Lyman et al. ................. 33/204 |
| 2,513,340 A | 7/1950 | Lyman ............................ 264/1 |

(Continued)

FOREIGN PATENT DOCUMENTS

FR    2849183    6/2004    ............. G01C 19/56

OTHER PUBLICATIONS

Apostolyuk, "Dynamics of Micromechanical Coriolis Vibratory Gyroscopes," Sensor Letters. vol. 2, 1-8, 2005.

(Continued)

*Primary Examiner* — Eric S McCall
(74) *Attorney, Agent, or Firm* — Sunstein Kann Murphy & Timbers LLP

(57) ABSTRACT

A substrate for an inertial sensor system includes a plurality of electrode arrangements, each electrode arrangement including an acceleration sensor electrode and a pair of quadrature adjusting electrodes on opposite sides of the acceleration sensor electrode, where each electrode arrangement is capable of being overlaid by a corresponding plate of a shuttle such that the plate completely overlays the acceleration sensor electrode and partially overlays the pair of quadrature adjusting electrodes on opposite sides of the acceleration sensor electrode such that capacitive coupling between the plate and each of the quadrature adjusting electrodes is dependent upon the rotational position of the at least one shuttle while capacitive coupling between the plate and the acceleration sensor electrodes is substantially independent of the rotational position of the at least one shuttle.

27 Claims, 11 Drawing Sheets

(56) References Cited

U.S. PATENT DOCUMENTS

| | | | | |
|---|---|---|---|---|
| 4,267,478 | A | 5/1981 | Ljung et al. | 310/315 |
| 4,384,409 | A | 5/1983 | Lao | 33/318 |
| 4,755,057 | A | 7/1988 | Curby et al. | 356/350 |
| 4,884,446 | A | 12/1989 | Ljung | 73/505 |
| 5,025,346 | A | 6/1991 | Tang et al. | 361/283 |
| 5,034,905 | A | 7/1991 | Widdau et al. | 364/606 |
| 5,275,047 | A | 1/1994 | Zabler et al. | 73/505 |
| 5,349,855 | A | 9/1994 | Bernstein et al. | 73/505 |
| 5,359,893 | A | 11/1994 | Dunn | 73/505 |
| 5,392,650 | A | 2/1995 | O'Brien et al. | 73/517 |
| 5,635,640 | A | 6/1997 | Geen | 73/504.12 |
| 5,656,778 | A | 8/1997 | Roszhart | 73/504.04 |
| 5,869,760 | A | 2/1999 | Geen | 73/504.12 |
| 5,939,633 | A | 8/1999 | Judy | 73/514.32 |
| 5,992,233 | A | 11/1999 | Clark | 73/514.35 |
| 6,032,531 | A | 3/2000 | Roszhart | 73/504.04 |
| 6,122,961 | A | 9/2000 | Geen et al. | 73/504.12 |
| 6,343,509 | B1 | 2/2002 | Fell et al. | 73/504.13 |
| 6,370,954 | B1 | 4/2002 | Zerbini et al. | 73/514.01 |
| 6,505,511 | B1 | 1/2003 | Geen et al. | 73/504.12 |
| 6,553,833 | B1 | 4/2003 | Funk et al. | 73/504.14 |
| 6,564,637 | B1 | 5/2003 | Schalk et al. | 73/504.12 |
| 6,654,424 | B1 | 11/2003 | Thomae et al. | 375/257 |
| 6,742,389 | B2 | 6/2004 | Nguyen et al. | 73/504.12 |
| 6,837,107 | B2 | 1/2005 | Geen | 73/504.04 |
| 6,877,374 | B2 | 4/2005 | Geen | 73/504.14 |
| 6,892,576 | B2 | 5/2005 | Samuels et al. | 73/514.32 |
| 7,032,451 | B2 | 4/2006 | Geen | 73/504.14 |
| 7,036,373 | B2 | 5/2006 | Johnson et al. | 73/504.14 |
| 7,051,590 | B1 | 5/2006 | Lemkin et al. | 73/504.04 |
| 7,360,423 | B2 | 4/2008 | Ayazi et al. | 73/504.12 |
| 7,396,476 | B2 | 7/2008 | Ridley et al. | 216/2 |
| 7,421,897 | B2 | 9/2008 | Geen et al. | 73/504.12 |
| 7,461,552 | B2 | 12/2008 | Acar | 73/504.04 |
| 7,543,496 | B2 | 6/2009 | Ayazi et al. | 73/504.12 |
| 7,640,803 | B1 | 1/2010 | Gutierrez et al. | 73/504.04 |
| 7,984,648 | B2 | 7/2011 | Horning et al. | 73/504.12 |
| 8,151,641 | B2 | 4/2012 | Geen | 73/504.12 |
| 8,616,055 | B2 | 12/2013 | Geen | 73/504.12 |
| 2004/0134279 | A1 | 7/2004 | Fell et al. | 73/504.13 |
| 2004/0211257 | A1 | 10/2004 | Geen | 73/504.04 |
| 2005/0081633 | A1 | 4/2005 | Nasiri et al. | 73/514.29 |
| 2005/0205959 | A1 | 9/2005 | Chau et al. | 257/467 |
| 2006/0021433 | A1 | 2/2006 | Willig et al. | 73/504.02 |
| 2006/0150745 | A1 | 7/2006 | Lang | 73/849 |
| 2006/0201233 | A1 | 9/2006 | Schroeder | 73/1.77 |
| 2007/0220971 | A1 | 9/2007 | Ayazi et al. | 73/504.02 |
| 2008/0282833 | A1 | 11/2008 | Chaumet | 74/5 R |
| 2011/0030474 | A1 | 2/2011 | Kuang et al. | 73/504.16 |
| 2011/0041609 | A1 | 2/2011 | Clark et al. | 73/514.29 |
| 2011/0167891 | A1 | 7/2011 | Geen | 73/1.38 |
| 2011/0270569 | A1 | 11/2011 | Stephanou et al. | 702/141 |
| 2012/0137774 | A1 | 6/2012 | Judy et al. | 73/504.12 |

OTHER PUBLICATIONS

Jiang et al., "A Monolithic Surface Micromachined Z-Axis Gyroscope with Digital Output," *Symposium on VLSI Circuits*, 4 pages, Jun. 2000.

Shkel et al., "Two Types of Micromachined Vibratory Gyroscopes," IEEE, pages 531-526, 2005.

Tatar, "Quadrature Error Compensation and its Effects on the Performance of Fully Decoupled MEMS Gyroscopes," A Thesis Submitted to the Graduate School of Natural and Applied Sciences of Middle East Technical University, 169 pages, Sep. 2010.

Weinberg et al., "Error Sources in In-Plane Silicon Tuning-Fork MEMS Gyroscopes," *The Draper Technology Digest, Draper Laboratory*, vol. 11, 2007.

Xie et al., "Fabrication, Characterization, and Analysis of the DRIE CMOS-MEMO Gyroscope," IEEE Sensors Journal, vol. 3, No. 5, pp. 622-631, Oct. 2003.

Geen et al., "New iMEMS ® Angular—Rate—Sensing Gyroscope," Analog Dialogue 37-03, pp. 1-4 (2003).

Saukoski, "System and Circuit Design for a Capacitive MEMS Gyroscope," Doctoral Dissertation, TKK Dissertations 116, Helsinki University of Technology, 279 pages (2008).

International Searching Authority, International Search Report—International Application No. PCT/US2010/035071, dated Nov. 17, 2011, together with the Written Opinion of the International Searching Authority, 8 pages.

ELECTRODE ARRANGEMENTS FOR QUADRATURE SUPPRESSION IN INERTIAL SENSORS

CROSS-REFERENCE TO RELATED APPLICATION(S)

This patent application is a divisional of, and therefore claims priority from, U.S. patent application Ser. No. 13/442,010 filed Apr. 9, 2012, which is a divisional of, and therefore claims priority from, U.S. patent application Ser. No. 12/469,899 filed May 21, 2009 (U.S. Pat. No. 8,151,641; each of these patent applications is hereby incorporated herein by reference in its entirety.

TECHNICAL FIELD

The present invention relates to micromachined inertial sensors, and more particularly to mode matching in micromachined inertial sensors.

BACKGROUND ART

Micromachined (MEMS) gyroscopes have become established as useful commercial items. Generally speaking, a MEMS gyroscope incorporates two high-performing MEMS devices, specifically a self-tuned resonator in the drive axis and a micro-acceleration sensor in the sensing axis. Gyroscope performance is very sensitive to such things as manufacturing variations, errors in packaging, driving, linear acceleration, and temperature, among other things. Basic principles of operation of angular-rate sensing gyroscopes are well understood and described in the prior art (e.g., Geen, J. et al., *New iMEMS Angular-Rate-Sensing Gyroscope,* Analog Devices, Inc., Analog Dialog 37-03 (2003), available at http://www.analog.com/library/analogDialogue/archives/37-03/gyro.html, which is hereby incorporated herein by reference in its entirety).

The principles of vibratory sensing angular rate gyroscopes with discrete masses are long-established (see, for example, Lyman, U.S. Pat. No. 2,309,853 and Lyman, U.S. Pat. No. 2,513,340, each of which is hereby incorporated herein by reference in its entirety). Generally speaking, a vibratory rate gyroscope works by oscillating a proof mass (also referred to herein as a "shuttle" or "resonator"). The oscillation is generated with a periodic force applied to a spring-mass-damper system at the resonant frequency. Operating at resonance allows the oscillation amplitude to be large relative to the force applied. When the gyroscope is rotated, Coriolis acceleration is generated on the oscillating proof mass in a direction orthogonal to both the driven oscillation and the rotation. The magnitude of Coriolis acceleration is proportional to both the velocity of the oscillating proof mass and the rotation rate. The resulting Coriolis acceleration can be measured by sensing the deflections of the proof mass. The electrical and mechanical structures used to sense such deflections of the proof mass are referred to generally as the accelerometer.

Many MEMS gyroscopes employ balanced comb drives of the type described generally in Tang, U.S. Pat. No. 5,025,346, which is hereby incorporated herein by reference in its entirety. General use of a micromachined layer above a semiconductor substrate with Coriolis sensing perpendicular to that substrate is described generally in Zabler, U.S. Pat. No. 5,275,047, which is hereby incorporated herein by reference in its entirety. Exemplary MEMS gyroscopes are described in Bernstein, U.S. Pat. No. 5,349,855; Dunn, U.S. Pat. No. 5,359,893; Geen, U.S. Pat. No. 5,635,640; Geen, U.S. Pat. No. 5,869,760; Zerbini, U.S. Pat. No. 6,370,954; and Geen U.S. Pat. No. 6,837,107, each of which is hereby incorporated herein by reference in its entirety. The latter four patents employ rotationally vibrated mass(es).

One problem in the manufacture of MEMS gyroscopes is that the Coriolis signals on which they depend are relatively small. It has been long recognized (e.g. Ljung, U.S. Pat. No. 4,884,446 or O'Brien, U.S. Pat. No. 5,392,650 or Clark, U.S. Pat. No. 5,992,233, each of which is hereby incorporated herein by reference in its entirety) that the signal size of a vibratory gyroscope can be magnified by operating the Coriolis accelerometer at resonance, i.e., by matching the frequencies of the accelerometer to that of the vibrating shuttle. Generally speaking, this increase in signal size eases the associated electronics requirements and thereby reduces cost. However, generally speaking, the larger the resonant amplification, the more sensitive is the accelerometer phase shift to small frequency perturbations. Such phase shifts are particularly deleterious to gyroscope performance, so it is generally necessary, in practice, to either well separate the frequencies or tightly servo the frequency of the accelerometer to the frequency of the shuttle. A mechanism for controlling the frequency of a differential capacitance accelerometer is conveniently available from changing the applied common mode voltage.

One technique for sensing the frequency match in order to close a servo loop around that mechanism is to apply a small, periodic perturbation to the mechanism and servo to zero response modulated at that periodicity. This is analogous to the mode matching servo commonly used in laser gyroscopes (e.g. Ljung, U.S. Pat. No. 4,267,478 or Curley, U.S. Pat. No. 4,755,057, each of which is hereby incorporated herein by reference in its entirety). This method uses the quadrature signal which directly couples from the shuttle and which can be separated from the useful, in-phase signal by synchronous demodulation. In practice, the magnitude of that signal generally varies widely and therefore is generally also subject to some control mechanism if the mode-matching servo is to have defined gain. This would be straightforward were it not that a real system generally has some other phase errors so that, for best gyro performance, the magnitude of quadrature signal should be near zero.

Another, method would be to apply a shuttle-frequency signal electromechanically to the accelerometer and synchronously demodulate the displacement output, servoing for the null which occurs at the 90 degree resonant phase shift. This inevitably interferes with the Coriolis signal and effectively is only applicable to those gyroscopes that do not need static response, such as camera stabilizing gyros.

The problem is addressed, at the expense of complexity, in Thomae, U.S. Pat. No. 6,654,424, which is hereby incorporated herein by reference in its entirety, by applying two such signals symmetrically disposed about the desired resonance and servoing for equality of response from them. This involves two signal generators, two demodulators, two filters and a differencing means, over twice the circuitry which one might otherwise expect for the servo.

In vibratory rate gyroscopes, numerous factors, such as imperfections in the various mechanical structures and in the electronics used for driving and sensing, can cause oscillations of the accelerometer that can be confused with Coriolis acceleration and rotation rate. Such error sources are often referred to collectively as gyroscope offset. There are two main classes of gyroscope offset, namely in-phase error and quadrature error. Generally speaking, quadrature error results when the vibratory motion is not perfectly orthogonal to the accelerometer. In the presence of quadrature error, the accelerometer experiences deflections proportional to the driven displacement. In-phase error results when the vibratory drive force is not perfectly orthogonal to the accelerometer. With in-phase error, the accelerometer experiences deflections proportional to the oscillation driving force which, at resonance, is also proportional to the oscillation velocity. Gyroscope offset can vary over time, for example, due to changes in temperature.

One possible approach to reducing gyroscope offset is to attempt to minimize the offset through device design, manufacture, and packaging, but there are practical limits to this approach.

SUMMARY OF THE INVENTION

In a first embodiment there is provided n inertial sensor comprising (1) a substrate having a plurality of electrode arrangements, each electrode arrangement including an acceleration sensor electrode and a pair of quadrature adjusting electrodes on opposite sides of the acceleration sensor electrode; and (2) a resonator disposed in a device layer above the substrate and having at least one shuttle including a plurality of plates, each plate completely overlaying a corresponding acceleration sensor electrode and partially overlaying the pair of quadrature adjusting electrodes on opposite sides of the acceleration sensor electrode, such that capacitive coupling between the plate and each of the quadrature adjusting electrodes is dependent upon the rotational position of the at least one shuttle while capacitive coupling between the plate and the acceleration sensor electrodes is substantially independent of the rotational position of the at least one shuttle.

In various alternative embodiments, the inertial sensor may include a plurality of drive electrodes disposed in the device layer for rotationally dithering the at least one shuttle in a device layer plane. The inertial sensor may include a shuttle resonance drive servo coupled to the drive electrodes, the shuttle resonance drive servo configured to provide drive signals to the drive electrodes for rotationally dithering the at least one shuttle in the device layer plane. The inertial sensor may include a quadrature servo coupled to the quadrature adjusting electrodes, the quadrature servo configured to provide quadrature nullifying signals to the quadrature adjusting electrodes. The quadrature nullifying signals may be DC quadrature adjustment signals.

In further alternative embodiment, each shuttle may include an outer rim suspended via a number of spokes from a central hub. The substrate may include, for each of a number of spokes, a pair of quadrature adjusting electrodes on the substrate underlying the radial edges of the spoke. The inertial sensor may include a quadrature servo coupled to the quadrature adjusting electrodes of the electrode arrangements and coupled to the quadrature adjusting electrodes underlying the radial edges of the spokes, the quadrature servo configured to provide quadrature nullifying signals to the quadrature adjusting electrodes. The quadrature nullifying signals may be DC quadrature adjustment signals.

In further alternative embodiments, the inertial sensor may include a test signal generator coupled to the quadrature adjusting electrodes, the test signal generator configured to provide a test signal to the quadrature adjusting electrodes at a test signal frequency above a predetermined quadrature servo response frequency. The inertial sensor may include a mode matching servo coupled to the test signal generator and to the acceleration sensor electrodes, the mode matching servo configured to demodulate acceleration sensor signals received from the acceleration sensor electrodes with the test signal received from the test signal generator and to produce therefrom a bias signal. The mode matching servo may be coupled to the at least one shuttle to place the bias signal on the at least one shuttle or may be coupled to an electrode on the substrate underlying the at least one shuttle to place the bias signal on the said electrode.

In any of the above-embodiments, each electrode arrangement may include a phase-compensating electrode.

The resonator may include two shuttles that are mechanically coupled by a coupling flexure to ensure that the shuttles oscillate in anti-phase with one another.

In a second embodiment there is provided an apparatus for use with a resonator having at least one shuttle including a plurality of plates, the apparatus comprising a substrate having a plurality of electrode arrangements, each electrode arrangement including an acceleration sensor electrode and a pair of quadrature adjusting electrodes on opposite sides of the acceleration sensor electrode, each electrode arrangement capable of being overlaid by a corresponding plate of the at least one shuttle such that the plate completely overlays the acceleration sensor electrode and partially overlays the pair of quadrature adjusting electrodes on opposite sides of the acceleration sensor electrode such that capacitive coupling between the plate and each of the quadrature adjusting electrodes is dependent upon the rotational position of the at least one shuttle while capacitive coupling between the plate and the acceleration sensor electrodes is substantially independent of the rotational position of the at least one shuttle.

In various alternative embodiments, the substrate may further include at least one electrical connection for providing quadrature nullifying signals to the quadrature adjusting electrodes.

In further alternative embodiments, the substrate may further include at least one pair of quadrature adjusting electrodes configured to be overlaid by the radial edges of a corresponding spoke of the at least one shuttle. The substrate may include at least one electrical connection for providing quadrature nullifying signals to the quadrature adjusting electrodes of the electrode arrangements and to the quadrature adjusting electrodes underlying the radial edges of the spokes.

In any of the above-embodiments, each electrode arrangement may include a phase-compensating electrode.

BRIEF DESCRIPTION OF THE DRAWINGS

The foregoing features of the invention will be more readily understood by reference to the following detailed description, taken with reference to the accompanying drawings, in which:

FIG. 7A and FIG. 7B is a schematic top-view diagram of a vibratory gyroscope in accordance with an alternative embodiment of the present invention, in which FIG. 7A is a top view of the structures and FIG. 7B is a magnified view of certain structures;

DETAILED DESCRIPTION OF SPECIFIC EMBODIMENTS

Figure 1:
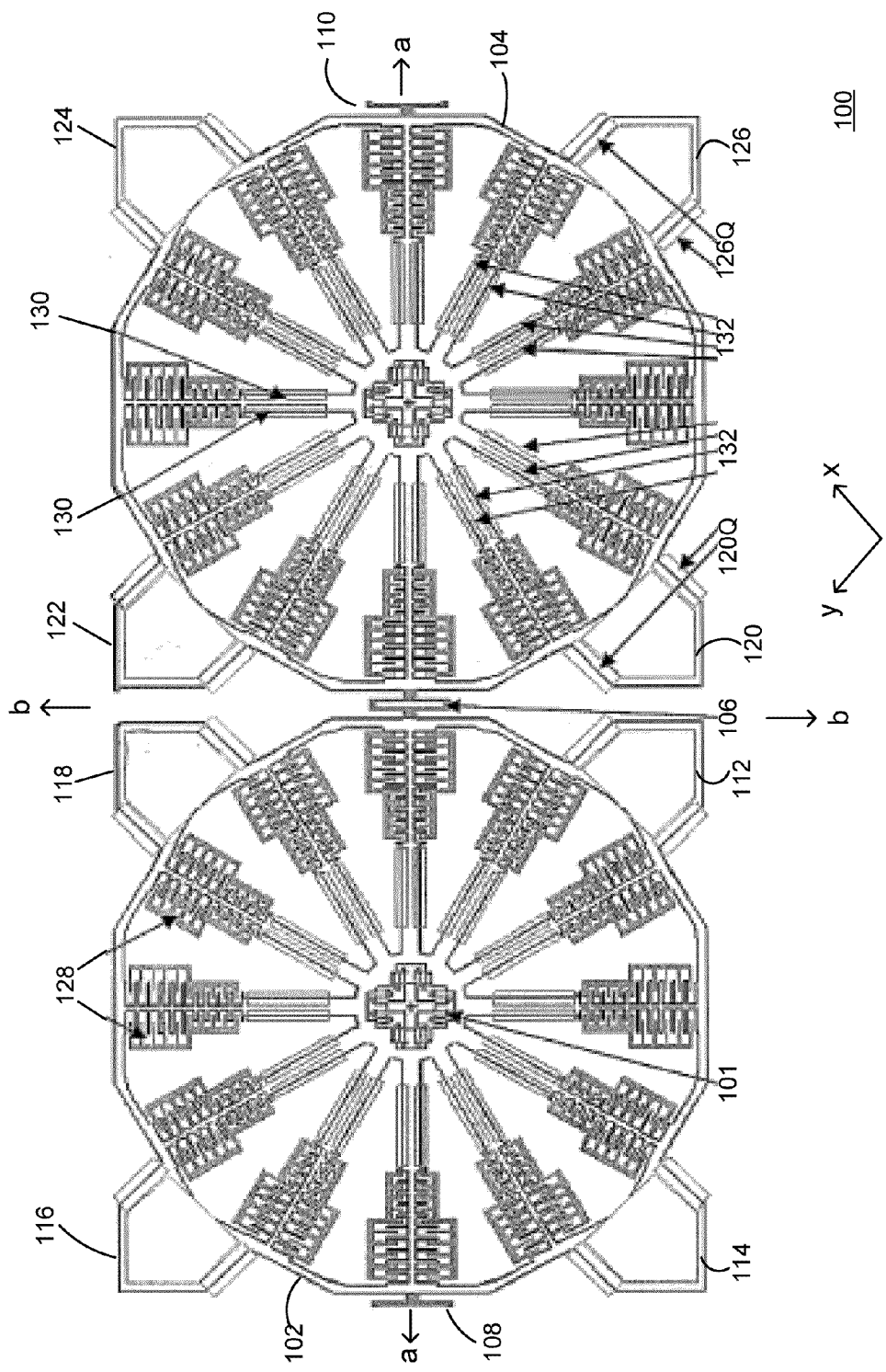
FIG. 1 is a schematic top-view diagram of a vibratory X-Y axis gyroscope in accordance with an exemplary embodiment of the present invention, highlighting the device layer structures.

Definitions. As used in this description and the accompanying claims, the following terms shall have the meanings indicated, unless the context otherwise requires.

A "set" includes one or more elements.

An "electrode" is a structure through which an electrical or electromechanical effect is applied and/or sensed. In exemplary embodiments, various electrodes are used for applying and/or sensing electrical or electromechanical effects through capacitive coupling, although it should be noted that other types of electrodes and couplings may be used (e.g., piezoelectric).

The term "quality factor" or "Q-factor" or simply "Q" denotes a dimensionless parameter that compares the time constant for decay of an oscillating physical system's amplitude to its oscillation period. Equivalently, it compares the frequency at which a system oscillates to the rate at which it dissipates its energy. A higher Q indicates a lower rate of energy dissipation relative to the oscillation frequency, so the oscillations die out more slowly. A system with a high Q resonates with a greater amplitude (at the resonant frequency) than one with a low Q factor, and its response falls off more rapidly as the frequency moves away from resonance. The term "Q" may also be used as a shorthand to refer to the resonance frequency of the resonator.

The "mode" of a resonating body is the shape of motion of the body at resonance.

The "response frequency" of an inertial sensor is the maximum angular acceleration rate that can be sensed. The response frequency may be represented by the pass frequency of a low-pass filter used to produce the inertial sensor output signal.

Exemplary embodiments of the present invention provide a relatively simple, mode frequency matching servo that does not disturb the Coriolis signal and uses an easily generated single-frequency test signal. The motion of a resonating gyroscope shuttle is amplitude modulated by the test signal so as to electromechanically induce signals in the Coriolis channel. The induced signals in the Coriolis channel are essentially a sum and difference of the shuttle mode frequency and the test signal frequency. Thus, the Coriolis channel signals include the Coriolis signals induced by external rotation of the gyroscope (i.e., the angular acceleration being sensed) as well as electromechanically modulated signals induced by modulating the motion of the shuttles. These signals are demodulated with the mathematical product of the test signal with shuttle frequency signal in order to produce a feedback bias signal that is applied to appropriate gyroscope structures. In exemplary embodiments, the test signal is applied to variable-overlap electrodes (e.g., electrodes used for quadrature adjustments) underlying an X-Y axis gyroscope or in the device plane of a Z axis gyroscope, and the bias signal is applied to the sensing electrodes or other completely overlapping electrodes underlying an X-Y axis gyroscope or in the device plane of a Z axis gyroscope. The test signal amplitude modulates the quadrature motion of the gyroscope and the feedback bias effectively softens the sensing Coriolis accelerometer springs electrically to modify the accelerometer resonance frequency (i.e., the bias acts as a negative spring). Coincidence of that frequency with the shuttle frequency is characterized by a 90 degree phase shift in the accelerometer response and is sensed by the phase sensitive characteristic of demodulation.

Figure 2:
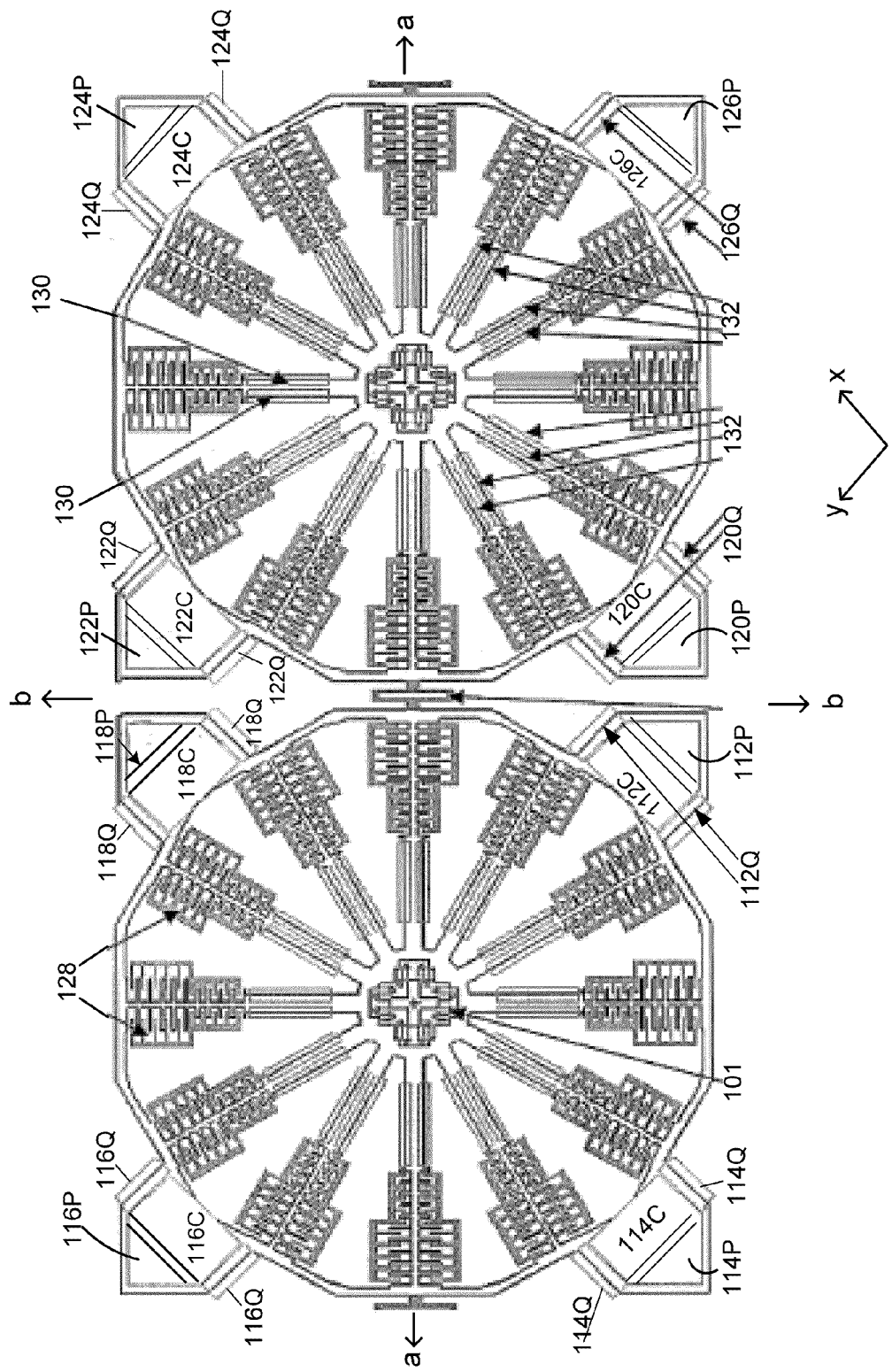
FIG. 2 is a schematic top-view diagram of a vibratory X-Y axis gyroscope in accordance with an exemplary embodiment of the present invention, highlighting the substrate layer structures in relation to the device layer structures highlighted in FIG. 1.

FIGS. 1 and 2 are schematic top-view diagrams of a vibratory X-Y axis gyroscope 100 in accordance with an exemplary embodiment of the present invention. This vibratory gyroscope operates generally as disclosed in Geen, U.S. Pat. No. 5,635,640, which is hereby incorporated herein by reference in its entirety. Specifically, this vibratory gyroscope includes various micromachined gyroscope structures in a device layer oriented above an underlying substrate having various substrate layer structures. For convenience, relevant gyroscope structures are described below with reference to axes labeled "a" and "b" in the device plane. The axes labeled "x" and "y" represent the axes about which Coriolis acceleration is sensed (i.e., the gyroscope sensing axes).

The gyroscope structures in the device plane include two rotationally-dithered masses (referred to hereinafter as shuttles) 102 and 104, each including an outer rim suspended via a number of spokes (in this case, twelve spokes, although different embodiments may use different numbers of spokes) from a central hub that is movably coupled to the substrate via a post (shaped like a "+") and suspension flexures 101 (for convenience, only one of the two post and suspension flexure arrangements is highlighted). The posts are affixed to the substrate, and the suspension flexures allow the shuttles to oscillate rotationally, with coupling flexure 106 and support flexures 108 and 110 helping to ensure that the shuttles oscillate in anti-phase with one another (i.e., shuttle 104 rotates counterclockwise when shuttle 102 is rotating clockwise, and vice versa) nominally within the device plane. For convenience, the dithered gyroscope structures in the device plane may be referred to collectively as a resonator.

Each of the spokes includes finger structures that interdigitate with corresponding comb structures affixed to the substrate (for convenience, only two of the twenty-four sets of combs are highlighted, with each set including two combs). In this exemplary embodiment, the twenty-four sets of combs are used for driving motion of the shuttles, where one comb in each pair is used for driving the shuttle in a clockwise direction and the other is used for driving the shuttle in a counter-clockwise direction, specifically by applying alternating electrical signals to the combs to cause the shuttles 102 and 104 to oscillate through capacitive coupling with the finger structures of the spokes. Velocity sensing electrodes are used in a feedback loop to sense and control oscillation of the shuttles. In this exemplary embodiment, velocity sensing electrodes 130 on the substrate underlying the radial edges of the a-oriented and b-oriented spokes (i.e., four spokes of each shuttle) are used for velocity sensing (for convenience, only one of the eight pairs of velocity sensing electrodes is highlighted).

In this exemplary embodiment, each of the shuttles includes four protruding plates that overlie corresponding electrode arrangements on the substrate, with each electrode arrangement including a Coriolis-sensing electrode, a phase-compensating electrode, and a pair of quadrature electrodes on either side of the Coriolis-sensing and phase-compensating electrodes. Specifically, shuttle 102 includes plates 112, 114, 116, and 118 that respectively overlie arrangements (112C, 112P, 112Q), (114C, 114P, 114Q), (116C, 116P, 116Q), and (118C, 118P, 118Q), while shuttle 104 includes plates 120, 122, 124, and 126 that respectively overlie arrangements (120C, 120P, 120Q), (122C, 122P, 122Q), (124C, 124P, 124Q), and (126C, 126P, 126Q), where "C" designates the Coriolis-sensing electrode, "P" designates the phase-compensating electrode, and "Q" designates the quadrature electrodes. Each plate completely overlies the Coriolis-sensing and phase-compensating electrodes but only partially overlies the quadrature electrodes, such that capacitive coupling between the plate and each of the quadrature electrodes is dependent on the rotational position of the shuttle while capacitive coupling between the plate and the Coriolis-sensing and phase-compensating electrodes is substantially independent of the rotational position of the shuttle. In this exemplary embodiment, the plates are positioned so as to align with the x and y axes (i.e., at approximately 45 degree angles relative to the a and b axes). It should be noted that, in this exemplary embodiment, the Coriolis-sensing electrodes are not aligned with any of the drive combs 128. The various electrodes are discussed in more detail below.

While the shuttles are oscillating at their resonance frequency (fo), driven via the drive combs 128 with feedback provided via the velocity sensing electrodes 130, out-of-plane movements of the gyroscope about the x and y axes cause the shuttles 102 and 104 to tip out-of-plane relative to the substrate through Coriolis forces, and these out-of-plane (i.e., Coriolis axis) movements of the shuttles are detected via the Coriolis-sensing electrodes through capacitive coupling with the plates. In this exemplary embodiment, such Coriolis forces are sensed in two axes by differential capacitance with respect to the Coriolis-sensing electrodes. For example, a rotation of the gyroscope about the x-axis can cause plates 114 and 124 to move toward their respective Coriolis-sensing electrodes while plates 118 and 120 move away from their respective Coriolis-sensing electrodes, and these movements are detected by changes in capacitance between each plate and its corresponding Coriolis-sensing electrode, with the signals obtained from the four Coriolis-sensing electrodes combined to provide a gyroscope output signal representing the movement of the gyroscope. Similarly, a rotation of the gyroscope about the y-axis can cause plates 116 and 126 to move toward their respective Coriolis-sensing electrodes while plates 112 and 122 move away from their respective Coriolis-sensing electrodes. It should be noted that the plates 112, 114, 116, 118, 120, 122, 124, and 126 fully overlay their respective Coriolis-sensing electrodes throughout the entire rotational range of motion of the shuttles so that signals obtained from the Coriolis-sensing electrodes are substantially independent of the rotational displacement of the shuttles.

Thus, the gyroscope resonator can be characterized by two modes, namely a shuttle resonance mode (i.e., the mode of the shuttles in the device plane) and an accelerometer resonance mode (i.e., the mode of the shuttles in the Coriolis axis). It is generally desirable for the two modes to match, as this tends to increase signal-to-noise ratio of the gyroscope. In embodiments of the present invention, the accelerometer resonance mode frequency is generally higher than the shuttle resonance mode frequency and the two modes are matched by effectively decreasing the accelerometer resonance mode frequency until it matches the shuttle resonance mode frequency, as discussed below.

Furthermore, even in the absence of any external movement of the gyroscope, oscillation of the shuttles typically results in slight out-of-plane movements of the shuttles, for example, due to imbalances in the shuttles and their respective support structures, and such out-of-plane movements of the shuttles can be misinterpreted as Coriolis signals and therefore represent error signals. As discussed above, such error signals may include an in-phase component and a quadrature component. While the quadrature error signals can be substantially greater than the phase error signals and therefore can swamp electronic circuitry that compensates for phase errors, it is generally desirable to remove both error components. In a gyroscope of the type shown in FIGS. 1 and 2, where the accelerometer resonance mode is out-of-plane with the shuttle resonance mode, it is generally impractical to use mechanical structures (e.g., levers and flexures) to eliminate the quadrature and in-phase error components.

Therefore, in a manner similar to that described by Clark in U.S. Pat. No. 5,992,233 or Geen in U.S. Pat. No. 7,032,451, each of which is hereby incorporated herein by reference in its entirety, quadrature adjustments are made by exerting a net torque on the shuttles in the Coriolis axis (i.e., out of the device plane). Quadrature suppression is also discussed in Lemkin, U.S. Pat. No. 7,051,590; in Chaumet, U.S. Patent Application Publication No. 2008/0282833; and in Saukoski, M., *System and Circuit Design for a Capacitive MEMS Gyroscope*, Doctoral Dissertation, TKK Dissertations 116, Helsinki University of Technology, Espoo, Finland (2008), each of which is hereby incorporated herein by reference in its entirety.

In the exemplary embodiment shown in FIGS. 1 and 2, quadrature adjusting electrodes on the substrate positioned under the edges of the plates (i.e., quadrature adjusting electrodes 112Q, 114Q, 116Q, 118Q, 120Q, 122Q, 124Q, and 126Q) as well as under the radial edges of the eight spokes of each shuttle positioned between the a-oriented and b-oriented spokes (i.e., quadrature adjusting electrodes 132; for convenience, only four of the sixteen pairs of quadrature adjusting electrodes 132 are highlighted) are used for making quadrature adjustments, although in alternative embodiments, similar quadrature adjustments can be made by applying bias voltages to the Coriolis sensing electrodes. A DC quadrature adjustment signal is applied to the quadrature adjusting electrodes so as to exert a net torque on the shuttles. Since the quadrature adjusting electrodes extend beyond the edges of the plates and spokes, the torque produced by the quadrature adjusting electrodes is proportional to the vibratory displacement of the shuttles in the device plane and is a function of the difference between the potentials of the electrodes. Thus, the torque causes a quadrature motion in the Coriolis axis (i.e., the axis normal to the device plane) that is modulated by the potential of the quadrature adjusting electrodes.

It should be noted that some of the combs may be used for velocity sensing in addition to, or in lieu of, separate velocity sensing electrodes. It also should be noted that the velocity sensing electrodes 130 and the quadrature adjusting electrodes are somewhat interchangeable; a particular pair of electrodes may be used for velocity sensing and/or quadrature adjustment as desired for a particular implementation.

In practice, in can be difficult to match the accelerometer resonance mode with the shuttle resonance mode, in part because the rotational frequency of the shuttles generally changes over time, for example, due to temperature changes and other factors. Therefore, in embodiments of the present invention, a high-frequency test (carrier) signal is applied to the quadrature adjusting electrodes to induce accelerometer signals in the Coriolis channel that are 90 degrees phase shifted with respect to the Coriolis acceleration signal (i.e., the quadrature adjusting electrodes generate a quadrature output modulated by the input test signal), and the accelerometer resonance mode is adjusted by placing an appropriate biasing voltage on the gyroscope structures until there are no Coriolis channel signals at the test signal frequency. Thus, the test signal applied to the quadrature adjusting electrodes causes the quadrature motion of the shuttles to be amplitude modulated with the test frequency in the Coriolis axis. The test signal is provided at a frequency sufficiently above the gyroscope response frequency, so that the test signal is not detected by the signal filtering in the Coriolis channel and therefore does not affect the gyroscope output, but at a frequency sufficiently below the accelerometer resonance mode frequency, so that the Coriolis accelerometer will respond to the test signals. For example, in an exemplary embodiment, the gyroscope response frequency may be below approximately 32 Hz, and the shuttle resonance mode frequency (fo) may be approximately 64 KHz, and the test signal frequency may be an integer fraction of the shuttle resonance mode frequency, e.g., between approximately 1 KHz to 8 KHz (i.e., fo/64 to fo/8). Furthermore, the test signal preferably averages to zero over time and therefore may be provided so that it alternately perturbs the shuttles in one direction for half the time and in the other direction for half the time. The test signal effectively modulates the motion of the shuttles in the Coriolis axis, so the induced accelerometer signals are a product of the test signal with the motion of the shuttles.

When the modes are exactly matched, the test signal component of the Coriolis channel signals is output as just phase and the Coriolis signal is output as quadrature. When the modes are not exactly matched, however, some of the test signal shows up in the Coriolis channel signals as quadrature (i.e., there will be an out-of-phase component that is used to produce the bias signal applied to the shuttles). In order to separate the signal components, the Coriolis signal is demodulated against quadrature and the quadrature signal is demodulated against phase, as described in greater detail below.

If necessary or desirable for a particular embodiment, the average voltage on the quadrature adjusting electrodes may also be adjusted independently of the test signal, for example, by a quadrature nulling servo with bandwidth much smaller than the test signal frequency. Thus, the effective quadrature output can be as near zero as is needed for accuracy while leaving a modulated quadrature signal for use in the mode frequency matching servo. That modulated signal can be demodulated against a product of the test signal with a shuttle frequency signal to give the desired servo error term. In embodiments that employ a digital demodulator (synchronous rectifier), this product can be formed, for example, by forming an exclusive-or of the test and shuttle signals or by successive demodulation with those individual signals. There could be a residual ripple with zero mean at a harmonic of the test-signal frequency even when the frequency servo is locked, although this should not disturb the Coriolis signal if the test signal frequency is placed beyond the pass band of the Coriolis output smoothing filter, as discussed more fully below.

Figure 3:
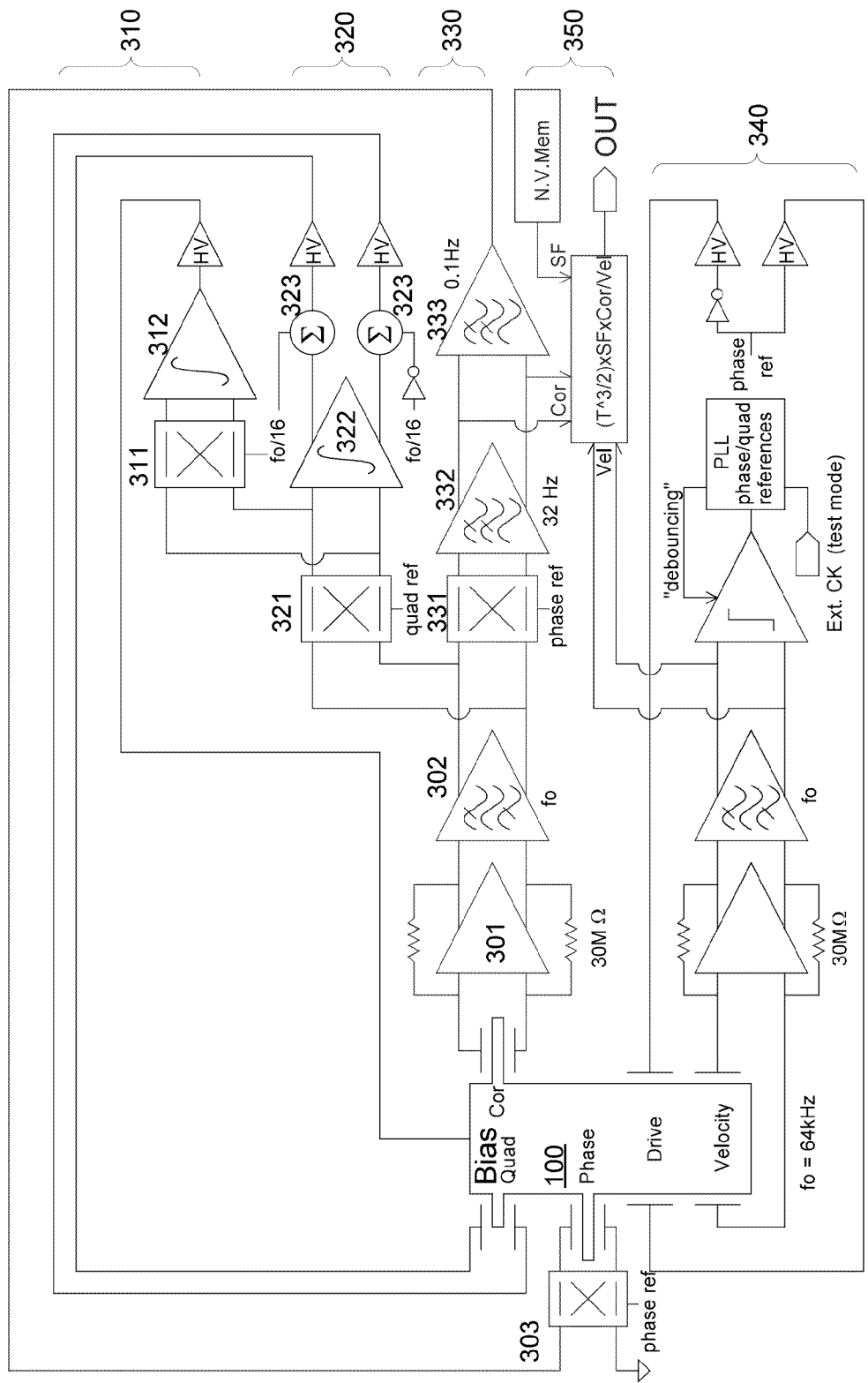
FIG. 3 is a schematic block diagram showing electronic circuitry suitable for use with the gyroscope of FIGS. 1 and 2, in accordance with an exemplary embodiment of the present invention.
Figure 4:
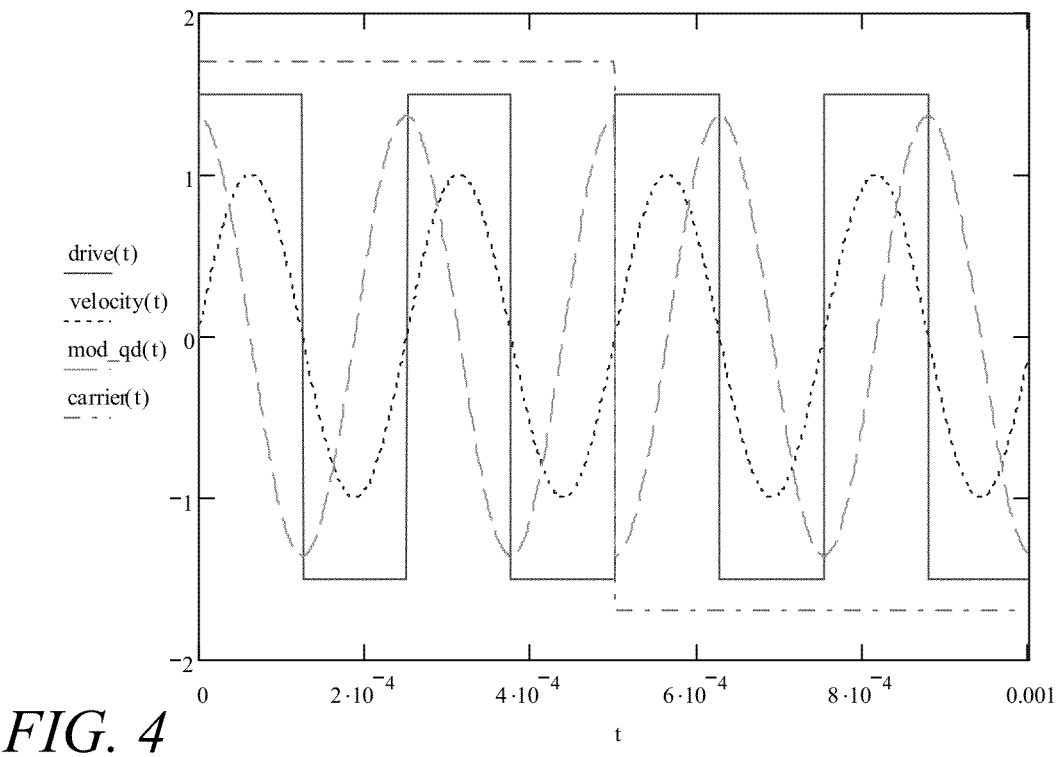
FIGS. 4-6 are schematic diagrams of idealized waveforms for the description of the electronic circuitry shown in FIG. 3.
Figure 5:
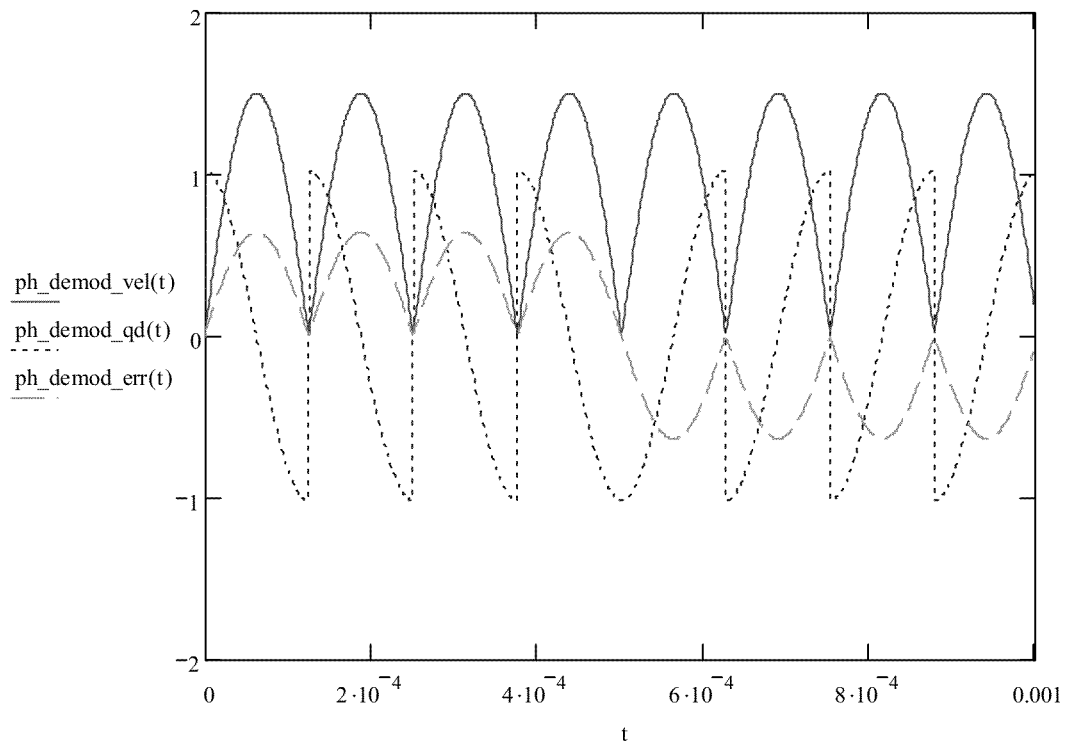
Figure 6:
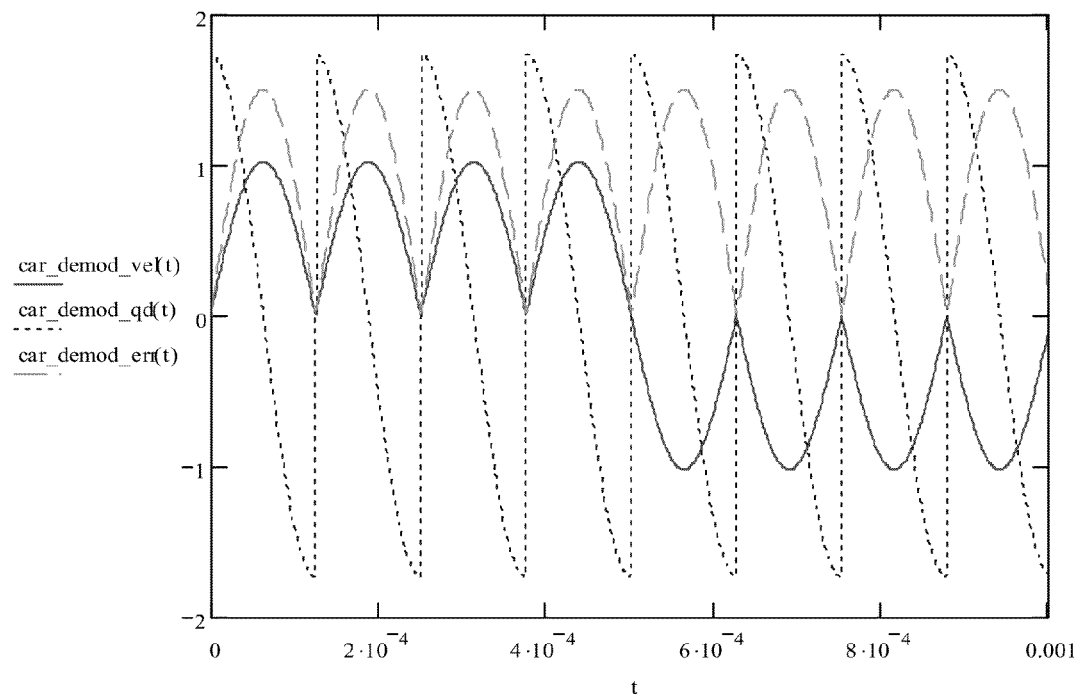

FIG. 3 is a schematic block diagram showing electronic control circuitry suitable for use with the gyroscope 100, in accordance with an exemplary embodiment of the present invention. Among other things, the electronic circuitry includes a biasing or mode matching servo 310, a quadrature servo 320, a phase servo 330, a shuttle resonance drive servo 340, a Coriolis output circuit 350, and related circuitry. These elements are described below with reference to the idealized waveforms shown in FIGS. 4-6.

The shuttle resonance drive servo 340 provides an alternating drive signal to the drive combs based on signals received from the velocity sensing electrodes, as discussed above. If the drive is at the shuttle resonance frequency, then the velocity is in phase with it and, consequently, so is the Coriolis force. The shuttle resonance drive servo 340 also provides phase and quadrature reference signals from a phase-locked loop (PLL) circuit.

The quadrature servo 320 receives amplified (301) and filtered (302) Coriolis channel signals from the Coriolis-sensing ("Cor") electrodes. As described below, the Coriolis channel signals include the Coriolis signals as well as signals induced by the electromechanical modulation of the shuttles in the Coriolis axis. The quadrature servo 320 demodulates (321) the Coriolis channel signals with the quadrature reference and integrates (322) the demodulated signals to produce low-frequency differential quadrature nullifying signals that are amplitude modulated with the high-frequency test signal (which in this exemplary embodiment is provided as a binary sub-multiple of the shuttle resonance mode frequency as shown by the addition of the fo/16 test frequency by the two components 323 labeled "Σ") and fed back to the quadrature adjustment ("Quad") electrodes, as shown in FIG. 3 by the feedback signals from the quadrature servo 320 to the Quad electrodes. Thus, a carrier modulated quadrature signal (mod_qd) appears along with the Coriolis signal on the Cor electrodes. The quadrature servo 320 is configured to be too slow to respond to the test signal applied to the quadrature electrodes.

The phase servo 330 also receives the amplified (301) and filtered (302) Coriolis channel signals from the Cor electrodes. The phase servo 330 demodulates (331) the Coriolis channel signals with the phase reference, which rectifies the Coriolis component to give an output with non-zero low-frequency value (ph_demod_vel). The accompanying modulated quadrature signal gives an output from that same demodulation process which cancels in a full cycle of the drive to yield no average disturbance (ph_demod_qd). If the accelerometer resonance mode is not tuned to exactly the shuttle resonance mode, then it responds to the modulated quadrature input with not only modulated quadrature but also an error component in phase with the Coriolis signal (ph_demod_err). This error signal also averages to zero each full cycle of the fo/16 (carrier) test signal, producing no net output to interfere with the low-pass filtered (332) version of the demodulated Coriolis signal passed to the Coriolis output circuit 350 (i.e., the required gyroscope output is effectively unperturbed by the test signal). In this exemplary embodiment, the Coriolis signal is further filtered (333), remodulated (303) with the phase (drive) reference, and applied to the phase-compensating electrodes (112P, 114P, 116P, 118P, 120P, 122P, 124P, 126P) to remove very low frequency gyroscope drift components, although these components can be removed using other circuitry, so this feedback loop and/or the specific phase electrodes shown in FIGS. 1 and 2 should be considered optional with respect to embodiments of the present invention.

The mode matching servo 310 receives the output from the phase servo demodulator 331 and demodulates the signal with the fo/16 test signal, which converts both the Coriolis and modulated quadrature signals to zero-average components (car_demod_vel and car_demod_qd) and produces an error component (car_demod_err) with a low-frequency value. Specifically, the mode matching servo demodulator 311 outputs a DC signal proportional to the phase error, and the mode matching servo integrator 312 effectively removes the chopped up Coriolis signal and magnifies the phase error. The sign and magnitude of that low frequency phase error depend on the magnitude of the shuttle-to-accelerometer mode-matching error and is used to servo the accelerometer resonance frequency by (in this exemplary embodiment) placing a bias voltage on the shuttles to nullify the result of further demodulation of the demodulated phase signals from the phase servo 330 against the fo/16 test signal (i.e., locking to 90 degrees phase shift), as shown in FIG. 3 by the feedback signal to the Bias electrode. This bias adjustment is essentially a negative spring that effectively reduces the accelerometer resonance mode frequency. It should be noted that the present invention is not limited to placing the bias voltage on the shuttles; rather, the bias voltage may be applied to other electrodes such as, for example, the quadrature adjusting electrodes or to separate mode adjusting electrodes (not shown), although additional circuitry may be needed in such alternative embodiments. As mentioned above, the test signal frequency must be high enough for the quadrature servo 320 to not respond and for the Coriolis output smoothing filter 332 of the phase servo 330 to remove the test signal component, but also low enough for the accelerometer physically to respond to the test signal so that the test signal component shows up on the Cor electrodes. In practice, the quality factor (Q) of the accelerometer may slow its response sufficiently to require some phase delay to the carrier demodulator reference, which can be accomplished, for example, using a divider-based PLL system.

The Coriolis output circuit 350 produces the gyroscope output signal based on the demodulated and filtered Coriolis signal provided by the phase servo 330, a velocity ("Vel") signal provided by the shuttle resonance drive servo 340, a scale factor ("SF") obtained from a non-volatile memory, and a temperature signal ("T") provided by a temperature sensor (not shown).

In the exemplary embodiment shown in FIG. 3, the amplifiers preceding the quadrature demodulator 321 and phase demodulator 331 may be trans-resistance amplifiers. In an alternative embodiment, the amplifiers may be trans-capacitance amplifiers (which typically provide lower-noise), in which case the quadrature and phase references typically would be swapped.

In the exemplary embodiment shown in FIGS. 1 and 2, each shuttle includes plates that extend outwardly from the perimeter of the shuttle, with each plate completely overlaying a corresponding Coriolis (acceleration sensor) electrode and partially overlaying a pair of quadrature electrodes on opposite sides of the Coriolis electrode, such that capacitive coupling between the plate and the quadrature electrodes is dependent on the rotational position of the shuttle while capacitive coupling between the plate and the Coriolis electrode is substantially independent of the rotational position of the shuttle. It should be noted, however, that different shuttle and/or electrode configurations may be used in alternative embodiments. For example, in certain alternative embodiments, portions of the shuttle perimeter may be in capacitive coupling with the Coriolis-sensing electrodes.

Figure 7A:
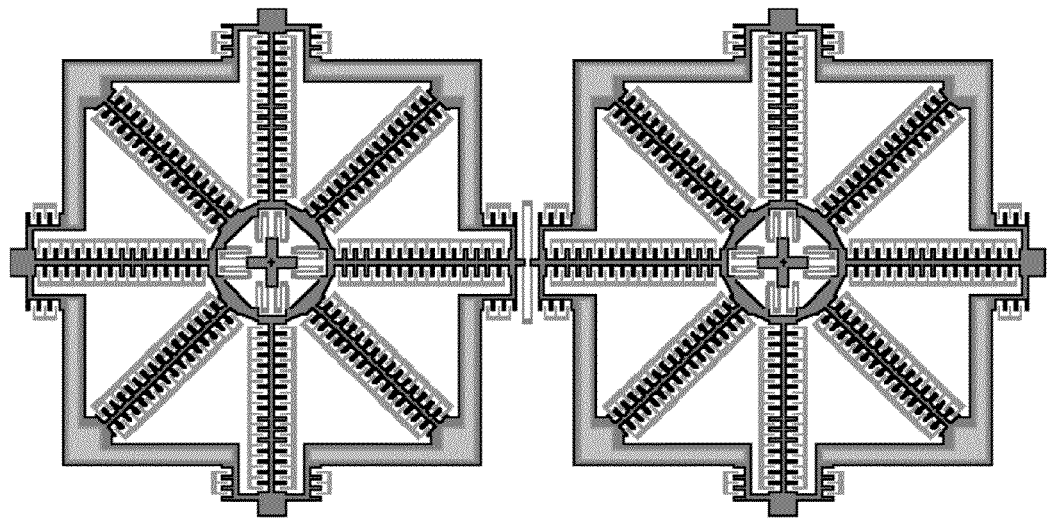
Figure 7B:
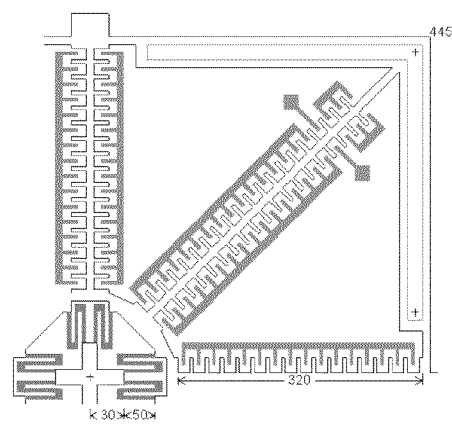

FIG. 7A and FIG. 7B is a schematic top-view diagram of a vibratory gyroscope in accordance with one alternative embodiment of the present invention. This vibratory gyroscope operates generally as the one described above with reference to FIGS. 1 and 2, but is considered to be a simpler design by virtue of having fewer structures. Also, the predominant gyroscope structures are oriented along the up and down axes or at 45 degree angles thereto, which facilitates micromachining because micromachining equipment (e.g., etching equipment) often produce etches based upon a rectilinear grid and so structures that are aligned with the grid or at 45 degree angles thereto generally may be produced more consistently and with straighter edges.

It should be noted that the present invention is not limited to the gyroscope designs shown in FIGS. 1-2 and FIGS. 7A-7B. In various alternative embodiments, gyroscopes having one, two, or more (e.g., four) shuttles of the types shown and described in Geen, U.S. Pat. No. 5,635,640 may be used. Furthermore, the present invention is not limited to shuttles that oscillate rotationally but can be applied more generally to other types of inertial sensors, e.g., vibratory and tuning-fork type gyroscopes, that operate under similar principles, in which sensing mode motions can be induced by a separate test signal and nullified by an appropriately configured servo. In various embodiments, the sensing mode may be in-plane or out-of-plane compared with the resonator mode.

Figure 8:
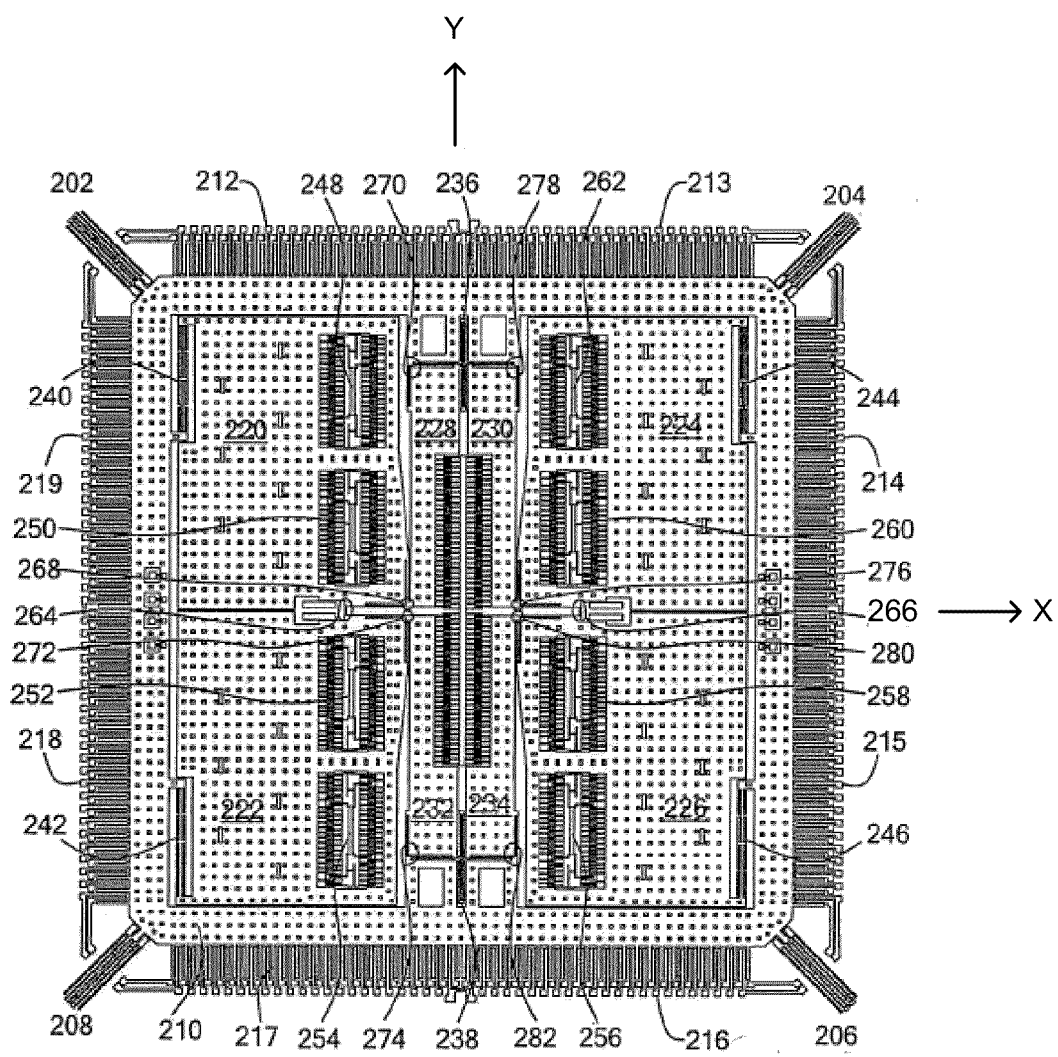
FIG. 8 is a schematic top-view diagram of an exemplary vibratory Z axis gyroscope in accordance with another alternative embodiment of the present invention.

FIG. 8 is a schematic top-view diagram of a vibratory Z axis gyroscope in accordance with another alternative embodiment of the present invention. This gyroscope operates generally as disclosed in Geen, U.S. Pat. No. 6,877,374, which is hereby incorporated herein by reference in its entirety. Among other things, this gyroscope structure includes a substantially square frame 210 that is suspended at its four corners by accelerometer suspension flexures 202, 204, 206, and 208. On the outside four edges of the frame 210 are fingers 212, 213, 214, 215, 216, 217, 218, and 219. Various resonating structures are suspended within the frame 210. These resonating structures include four movable shuttles 220, 222, 224, and 226, four levers 228, 230, 232, and 234, and two forks 236 and 238. It should be noted that the shuttles 222, 224, and 226 are substantially the same shape, size, and mass as the shuttle 220, and are oriented as mirror images of the shuttle 220 along the x and/or y axes. It should be noted that the levers 230, 232, and 234 are substantially the same shape, size, and mass as the lever 228, and are oriented as mirror images of the lever 228 along the x and/or y axes. The four movable shuttles 220, 222, 224, and 226 are suspended from the frame 210 by flexures 240, 242, 244, and 246, respectively. Movement of the four movable shuttles 220, 222, 224, and 226 is controlled electrostatically using electrostatic drivers 248, 250, 252, 254, 256, 258, 260, and 262. There are also electrostatic structures associated with the levers 228, 230, 232, and 234 that can be used for driving motion of the levers or sensing motion of the levers. These and other features of the micromachined gyroscope structure are described in more detail below.

The four accelerometer suspension flexures 202, 204, 206, and 208 are anchored to the substrate and are configured so as to substantially restrict movement of the frame 210 along the x axis and along the y axis (i.e., translational movement) while allowing the frame 210 to rotate more freely in either direction (i.e., rotational movement). Such rotational movement of the frame 110 is caused mainly from the Coriolis effect due to movement of the frame of reference of the resonating structures.

The fingers 212, 213, 214, 215, 216, 217, 218, and 219 extend from the four sides of the frame 210. Positioned between the fingers 212, 213, 214, 215, 216, 217, 218, and 219 are two sets of Coriolis sensors that are mechanically coupled to the substrate and do not move relative to the substrate. Movement of the frame 210 results in movement of the fingers 212, 213, 214, 215, 216, 217, 218, and 219 relative to the Coriolis sensors, which produces a change in capacitance that can be measured by electronic circuitry (not shown).

The resonating structures, including the shuttles 220, 222, 224, and 226, the flexures 240, 242, 244, and 246, the levers 228, 230, 232, and 234, and the forks 236 and 238, are mechanically coupled. The shuttles 220 and 222 are mechanically coupled via a pivot flexure 264, and the shuttles 224 and 226 are mechanically coupled via a pivot flexure 266. The shuttles 220 and 224 are mechanically coupled via the levers 228 and 230 and the fork 236, and the shuttles 222 and 226 are mechanically coupled via the levers 232 and 234 and the fork 238. The pivot flexures 264 and 266, the levers 228, 230, 232, and 234, and the forks 236 and 238 allow the shuttles 220, 222, 224, and 226 to move together.

The shuttle 220 is suspended from the frame 210 by the flexure 240, from the shuttle 222 by the pivot flexure 264, and from the lever 228 by the pivot flexure 268. The shuttle 222 is suspended from the frame 210 by the flexure 242, from the shuttle 220 by the pivot flexure 264, and from the lever 232 by the pivot flexure 272. The shuttle 224 is suspended from the frame 210 by the flexure 244, from the shuttle 226 by the pivot flexure 266, and from the lever 230 by the pivot flexure 276. The shuttle 226 is suspended from the frame 210 by the flexure 246, from the shuttle 224 by the pivot flexure 266, and from the lever 234 by the pivot flexure 280.

The lever 228 is suspended from the frame 210 by the pivot flexure 270, from the shuttle 220 by the pivot flexure 268, and from the lever 230 by the fork 236. The lever 230 is suspended from the frame 210 by the pivot flexure 278, from the shuttle 224 by the pivot flexure 276, and from the lever 228 by the fork 236. The lever 232 is suspended from the frame 210 by the pivot flexure 274, from the shuttle 222 by the pivot flexure 272, and from the lever 234 by the fork 238. The lever 234 is suspended from the frame 210 by the pivot flexure 282, from the shuttle 226 by the pivot flexure 280, and from the lever 232 by the fork 238.

The flexures 240, 242, 244, and 246 substantially restrict movement of the shuttles 220, 222, 224, and 226 respectively along the y axis, but allow movement of the shuttles 220, 222, 224, and 226 respectively along the x axis. The flexures 240, 242, 244, and 246 also allow the shuttles 220, 222, 224, and 226 respectively to pivot slightly as they move.

The pivot flexure 264 essentially locks the shuttles 220 and 222 together so that they move together. Likewise, the pivot flexure 266 essentially locks the shuttles 224 and 226 together so that they move together (although oppositely to the shuttles 220 and 222).

The levers 228 and 230, the fork 236, and the pivot flexures 268, 270, 276, and 278 essentially lock the shuttles 220 and 224 together so that they move in substantially equal but opposite directions. Likewise, the levers 232 and 234, the fork 238, and the pivot flexures 272, 274, 280, and 282 essentially lock the shuttles 222 and 226 together so that they move in substantially equal but opposite directions.

In theory, the various gyroscope structures are perfectly balanced so that they move with substantially the same frequency and phase. In practice, however, the various gyroscope structures are not perfectly balanced. For example, the shuttles 220, 222, 224, and 226 are theoretically identical (albeit mirror images in the x and/or y axes), but typically are not identical due at least in part to variations in the material and processes used to form the shuttles. Similar imbalances can occur in other gyroscope structures, such as the various levers, pivots, and flexures. These imbalances can manifest themselves in out-of-phase (i.e., quadrature) lateral movements of the shuttles, which can vary from device to device. The mechanical stiffnesses of the structures substantially suppresses these motions, but there is some residual quadrature.

Therefore, electrical quadrature suppression structures are typically used to reduce the amount of quadrature, as discussed above. In an embodiment of the present invention, a quadrature suppression structure typically includes at least one electrode located proximately to a portion of a shuttle along the direction of motion of the shuttle. When a voltage is applied to the electrode, a resulting electrostatic force produces a lateral force that attracts the shuttle toward the electrode. A single electrode is typically associated with each shuttle, although not all electrodes are typically activated. Rather, the quadrature behavior of a particular device is typically characterized to determine which (if any) electrodes to activate to reduce the quadrature.

Figure 9:
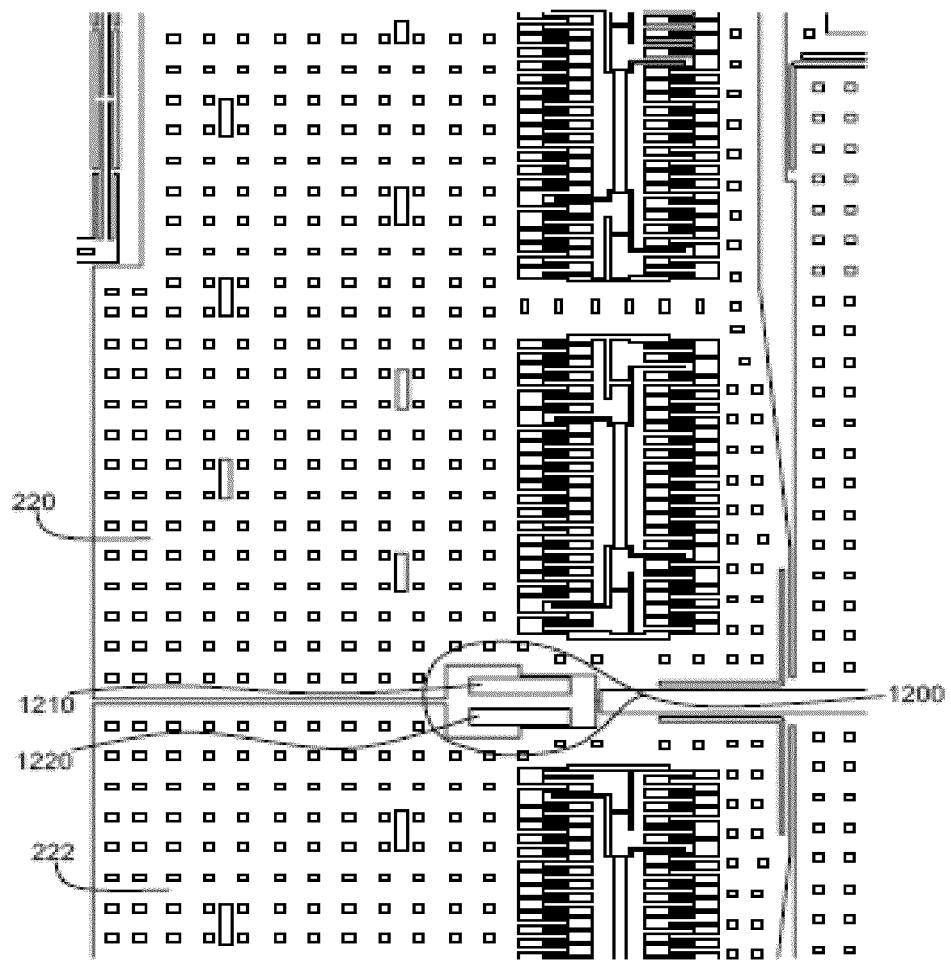
FIG. 9 shows a detailed view of quadrature adjusting electrodes of the gyroscope shown in FIG. 8.

Because the amount of quadrature varies with the movement of the shuttle, it is desirable for the lateral force applied by the electrode to likewise vary with the movement of the shuttle. In the embodiment shown in FIG. 8, variable-overlap quadrature adjusting electrodes are employed. As shown in FIG. 9, two electrodes 1210 and 1220 are placed between two adjacent shuttles 220 and 222, specifically in a cavity 1200 formed in and by the two shuttles 220 and 222 (similar electrodes are placed between the shuttles 224 and 226). The electrode 1210 is adjacent to the shuttle 220, and is capable of applying a lateral force on the shuttle 220 in the downward direction. The electrode 1220 is adjacent to the shuttle 222, and is capable of applying a lateral force on the shuttle 222 in the upward direction. In order to vary the amount of lateral force applied by an electrode, a notch is formed in each shuttle. The notch is formed adjacent to a portion of the electrode toward the end of the electrode closer to the frame. As the shuttle moves outward toward the frame, the length of shuttle that is directly adjacent to the electrode increases, resulting in a larger lateral force applied to the shuttle. As the shuttle moves inward away from the frame, the length of shuttle that is directly adjacent to the electrode decreases, resulting in a smaller lateral force applied to the shuttle. In order to cancel out static forces, it is common to activate one electrode between the shuttles 220 and 222 and one electrode between the shuttles 224 and 226. Also, a constant voltage is typically applied for the sake of simplicity, although a variable voltage could be used at the cost of increased complexity.

As in the exemplary embodiments described above with reference to FIGS. 1-2 and FIGS. 7A-7B, in order to match the shuttle resonance mode and the accelerometer resonance mode, a high-frequency test (carrier) signal may be used to modulate the motion of the shuttles to produce a net torque on the frame so as to induce accelerometer signals in the Coriolis channel that are 90 degrees phase shifted with respect to the Coriolis acceleration signal, and the accelerometer resonance mode may be adjusted by providing an appropriate biasing signal. In certain embodiments, the high-frequency test signal may be applied to the variable-overlap quadrature adjusting electrodes to induce the accelerometer signals in the Coriolis channel (i.e., the quadrature adjusting electrodes generate a quadrature output modulated by the input test signal). The test signal is provided in an asymmetric fashion such that the modulated motion of the shuttles produces a net force on the frame to induce the accelerometer signals, unlike the driver and quadrature adjusting signals, which are intended to prevent the motion of the shuttles from producing a net force on the frames. The bias signal may be applied between the Coriolis pickoff electrodes and the frames or to other appropriate structures. Thus, the test signal applied to the quadrature adjusting electrodes causes the quadrature motion of the shuttles to be amplitude modulated with the test frequency in the device plane. The test signal is provided at a frequency sufficiently above the gyroscope response frequency, so that the induced signal is not detected by the signal filtering in the Coriolis channel and therefore does not affect the gyroscope output, but at a frequency sufficiently below the accelerometer resonance mode frequency, so that the Coriolis accelerometer will respond to the test signals. Furthermore, the test signal preferably averages to zero over time and therefore may be provided so that it alternately perturbs the shuttles in one direction for half the time and in the other direction for half the time. The test signal effectively modulates the motion of the shuttles in device plane, so the induced accelerometer signals are a product of the test signal with the motion of the shuttles.

Figure 10:
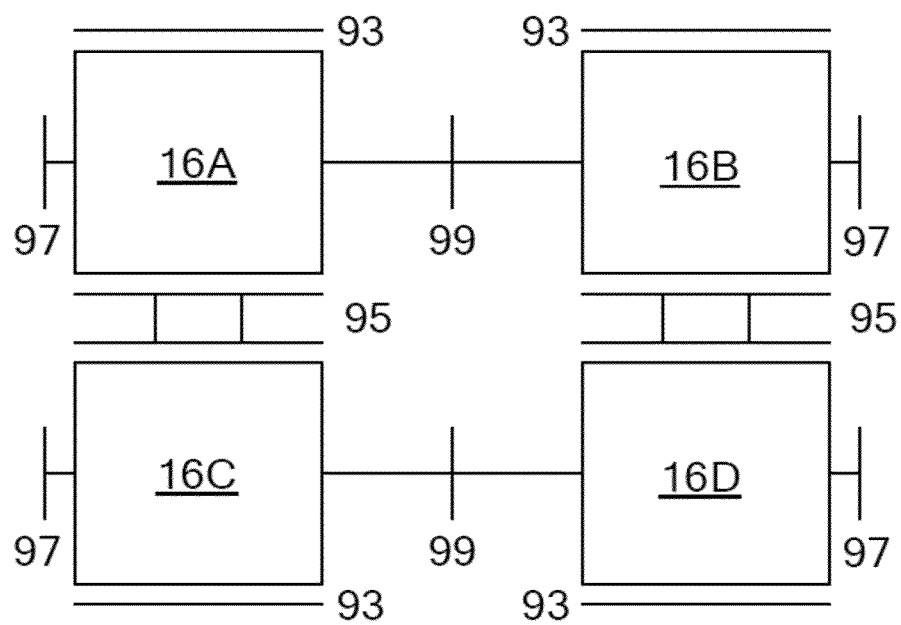
FIG. 10 is a schematic top-view diagram of a cross-quad Z axis gyroscope in accordance with another alternative embodiment of the present invention.

FIG. 10 is a schematic top-view diagram of a cross-quad Z axis gyroscope in accordance with another alternative embodiment of the present invention. This gyroscope operates generally as disclosed in Geen, U.S. Pat. No. 7,421,897, which is hereby incorporated herein by reference in its entirety. Specifically, four gyroscopes 16A-D are arranged in a vertically and horizontally coupled cross-quad configuration such that the top pair of gyroscope frames and the bottom pair of gyroscope frames are interconnected by couplings 99 that allow anti-phase movements of the frames along separate parallel Y axes, while the left side pair of gyroscope frames and the right side pair of gyroscope frames are interconnected by couplings 95 that allow co-linear anti-phase movements of the frames. Each gyroscope is preferably supported on the side opposite the vertical coupling 95 by a suspension 93. Each gyroscope is preferably supported on the side opposite the horizontal coupling 99 by a balancer 97 that offsets certain effects of the horizontal coupling. The gyroscopes 16A-D may be similar to the gyroscopes disclosed in U.S. Pat. Nos. 6,505,511 and 6,122,961, which are hereby incorporated herein by reference in their entireties.

Figure 11:
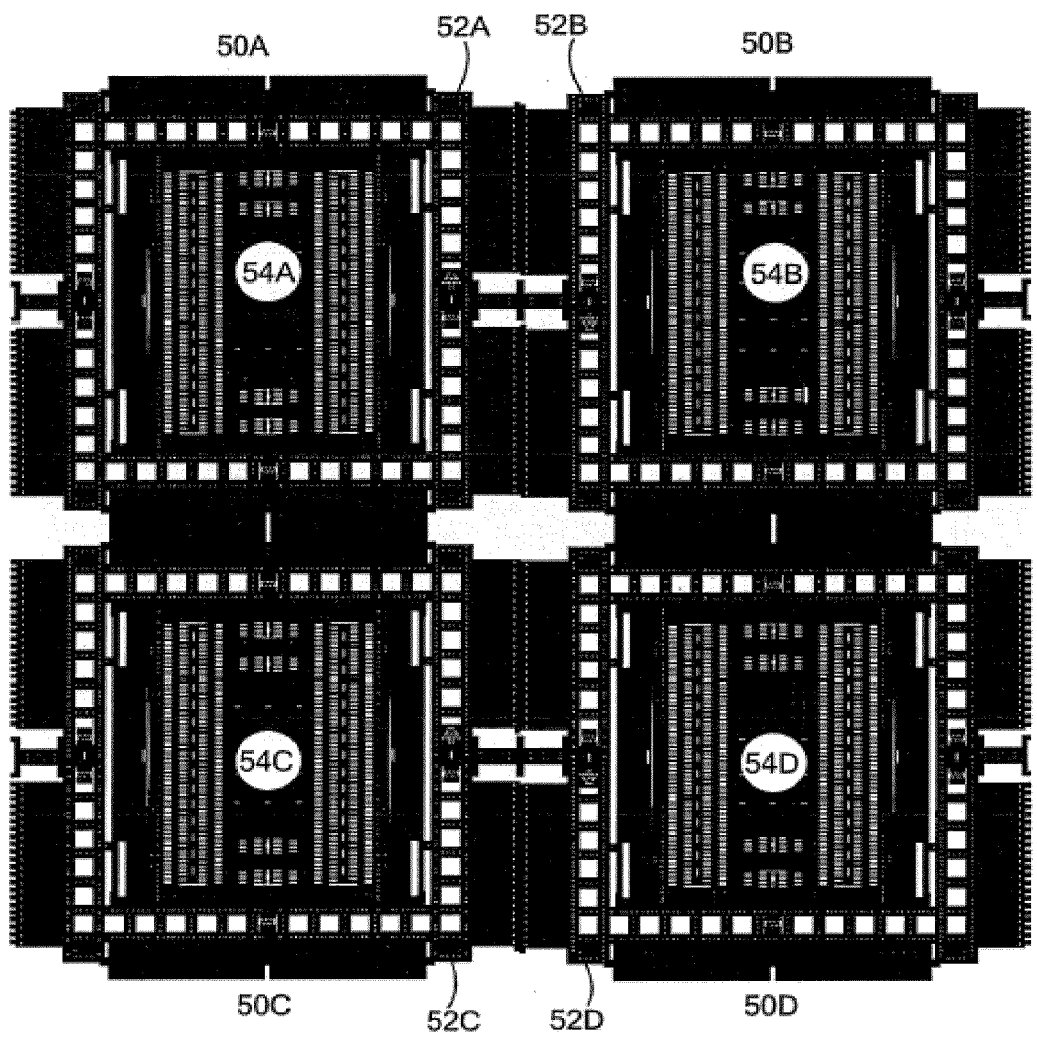
FIG. 11 shows a specific cross-quad gyroscope configuration that can be adapted for mode matching, in accordance with the embodiment shown in FIG. 10.

FIG. 11 shows a specific cross-quad gyroscope configuration that can be adapted for mode matching, in accordance with another alternative embodiment of the present invention. Here, each gyroscope 50A, 50B, 50C, 50D includes a frame (52A, 52B, 52C, 52D) and a resonator (54A, 54B, 54C, 54D) movably suspended within the inner periphery of the frame. The frames 52A and 52B of gyroscopes 50A and 50B are coupled to one another, as are the frames 52C and 52C of gyroscopes 50C and 50D. Furthermore, the frames 52A and 52C of gyroscopes 50A and 50C are coupled to one another, as are the frames 52B and 52D of gyroscopes 50B and 50D.

The resonators of each pair of gyroscopes 50A/50B and 50C/50D operate in anti-phase to one another. Furthermore, in an exemplary embodiment of the invention, the resonators of gyroscopes 50A and 50B operate in anti-phase to the corresponding resonators of gyroscopes 50C and 50D. Therefore, the resonators of gyroscopes that are diagonally opposite operate in phase with one another, while the resonators of any pair of adjacent gyroscopes operate in anti-phase with one another.

Also, the frames of each pair of gyroscopes 50A/50B and 50C/50D are coupled to allow movement in opposite directions but substantially restrict movement in the same direction. Furthermore, in accordance with an exemplary embodiment of the invention, the frames of gyroscopes 50A and 50C are coupled to allow movement in opposite directions but substantially restrict movement in the same direction, as are frames of gyroscopes 50B and 50D. The frames of gyroscopes 50A/50C move in anti-phase to the frames of gyroscopes 50B/50D. Therefore, the frames of gyroscopes that are diagonally opposite operate in phase with one another, while the frames of any pair of adjacent gyroscopes operate in anti-phase with one another.

The resonators are caused to resonate back and forth in the X-axis. Rotation of the inertial sensor about the Z-axis causes displacement of the frames in the Y-axis. For example, under some conditions, frames 52A and 52C of gyroscopes 50A and 50C move toward one another while frames 52B and 52D of gyroscopes 50B and 50D move away from one another. Under some other conditions, frames 52A and 52C of gyroscopes 50A and 50C move away from one another while frames 52B and 52D of gyroscopes 50B and 50D move toward one another.

Figure 12:
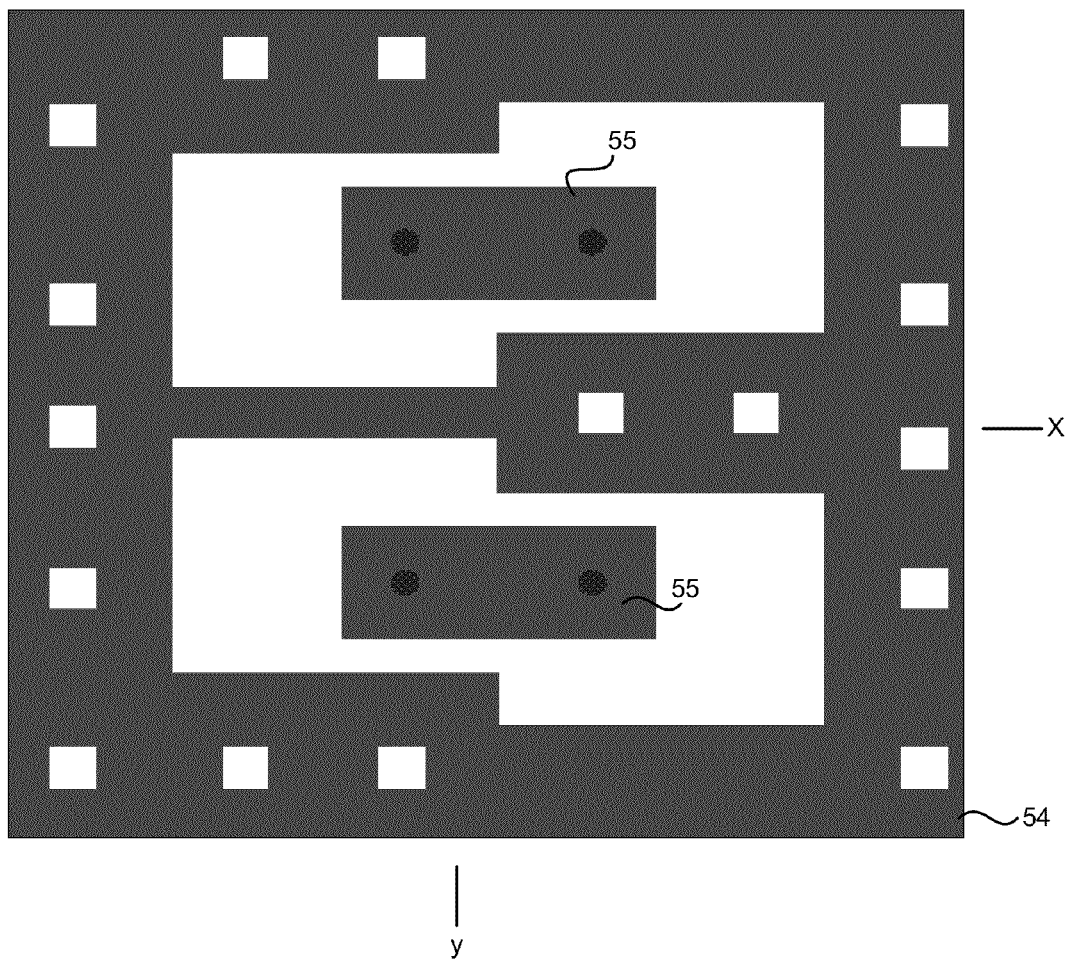
FIG. 12 shows an exemplary variable-overlap electrode configuration in accordance with the embodiment shown in FIG. 11.

As in the exemplary embodiments described above, in order to match the shuttle resonance mode and the accelerometer resonance mode, a high-frequency test (carrier) signal may be used to modulate the motion of the shuttles to produce Y-axis forces on the frame so as to induce accelerometer signals in the Coriolis channel that are 90 degrees phase shifted with respect to the Coriolis acceleration signal, and the accelerometer resonance mode may be adjusted by providing an appropriate biasing signal. In certain embodiments, the high-frequency test signal may be applied to variable-overlap electrodes to induce the accelerometer signals in the aggregated Coriolis channel (i.e., the electrodes generate a quadrature output modulated by the input test signal). FIG. 12 shows an electrode configuration for an exemplary embodiment, including two electrodes 55 positioned within notched cavities in the surrounding shuttle 54 to produce Y-axis forces as the shuttle resonates in the X-axis so as to vary the amount of overlap between each electrode 55 and the portions of the shuttle 54 adjacent thereto; in various alternative embodiments, one or more such electrode configurations may be used for each shuttle (e.g., one set or two mirror-image sets positioned substantially in the middle of each shuttle or four mirror-image sets positioned toward the corners of each shuttle), with the electrodes of each set driven by the outputs of a differential amplifier and the electrodes for shuttles 54A/D operating in phase with one another and the electrodes for shuttles 54B/C operating in phase with one another and in anti-phase with the electrodes of shuttles 54A/D. The test signal is provided in an asymmetric fashion such that the modulated motion of the shuttles produces a net force on the frames to induce the accelerometer signals, unlike the driver and quadrature adjusting signals, which are intended to prevent the motion of the shuttles from producing a net force on the frames. The bias signal may be applied between the Coriolis pickoff electrodes and the frames or to other appropriate structures. Thus, the test signal applied to the quadrature adjusting electrodes causes the quadrature motion of the shuttles to be amplitude modulated with the test frequency in the device plane. The test signal is provided at a frequency sufficiently above the gyroscope response frequency, so that the induced signal is not detected by the signal filtering in the Coriolis channel and therefore does not affect the gyroscope output, but at a frequency sufficiently below the accelerometer resonance mode frequency, so that the Coriolis accelerometer will respond to the test signals. Furthermore, the test signal preferably averages to zero over time and therefore may be provided so that it alternately perturbs the shuttles in one direction for half the time and in the other direction for half the time. The test signal effectively modulates the motion of the shuttles in device plane, so the induced accelerometer signals are a product of the test signal with the motion of the shuttles.

It should be noted that the bias signal may affect the magnitude of quadrature correction and other device parameters (e.g., the Coriolis scale factor). In exemplary embodiments, the quadrature servo automatically compensates for the bias signal, and the Coriolis scale factor similarly is compensated in the electronics.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An inertial sensor comprising:
a substrate having a plurality of electrode arrangements, each electrode arrangement including an acceleration sensor electrode and a pair of quadrature adjusting electrodes on opposite sides of the acceleration sensor electrode; and
a resonator disposed in a device layer above the substrate and having at least one shuttle including a plurality of plates, each plate completely overlaying a corresponding acceleration sensor electrode and partially overlaying the pair of quadrature adjusting electrodes on opposite sides of the acceleration sensor electrode, such that capacitive coupling between the plate and each of the quadrature adjusting electrodes is dependent upon the position of the at least one shuttle while capacitive coupling between the plate and the acceleration sensor electrodes is substantially independent of the position of the at least one shuttle.

2. An inertial sensor according to claim 1, further comprising:
a plurality of drive electrodes disposed in the device layer for dithering the at least one shuttle in a device layer plane.

3. An inertial sensor according to claim 2, further comprising:
a shuttle resonance drive servo coupled to the drive electrodes, the shuttle resonance drive servo configured to provide drive signals to the drive electrodes for dithering the at least one shuttle in the device layer plane.

4. An inertial sensor according to claim 1, further comprising:
a quadrature servo coupled to the quadrature adjusting electrodes, the quadrature servo configured to provide quadrature nullifying signals to the quadrature adjusting electrodes.

5. An inertial sensor according to claim 4, wherein the quadrature nullifying signals are DC quadrature adjustment signals.

6. An inertial sensor according to claim 1, wherein each shuttle includes an outer rim suspended via a number of spokes from a central hub.

7. An inertial sensor according to claim 6, wherein the substrate further comprises, for each of a number of spokes, a pair of quadrature adjusting electrodes on the substrate underlying the radial edges of the spoke.

8. An inertial sensor according to claim 7, further comprising:
a quadrature servo coupled to the quadrature adjusting electrodes of the electrode arrangements and coupled to the quadrature adjusting electrodes underlying the radial edges of the spokes, the quadrature servo configured to provide quadrature nullifying signals to the quadrature adjusting electrodes.

9. An inertial sensor according to claim 8, wherein the quadrature nullifying signals are DC quadrature adjustment signals.

10. An inertial sensor according to claim 1, further comprising:
a test signal generator coupled to the quadrature adjusting electrodes, the test signal generator configured to provide a test signal to the quadrature adjusting electrodes at a test signal frequency above a predetermined quadrature servo response frequency.

11. An inertial sensor according to claim 10, further comprising:
a mode matching servo coupled to the test signal generator and to the acceleration sensor electrodes, the mode matching servo configured to demodulate acceleration sensor signals received from the acceleration sensor electrodes with the test signal received from the test signal generator and to produce therefrom a bias signal.

12. An inertial sensor according to claim 11, wherein the mode matching servo is coupled to the at least one shuttle to place the bias signal on the at least one shuttle.

13. An inertial sensor according to claim 11, wherein the mode matching servo is coupled to an electrode on the substrate underlying the at least one shuttle to place the bias signal on the said electrode.

14. An inertial sensor according to claim 1, wherein each electrode arrangement further includes a phase-compensating electrode.

15. An inertial sensor according to claim 1, wherein the resonator includes two shuttles that are mechanically coupled by a coupling flexure to ensure that the shuttles oscillate in anti-phase with one another.

16. An apparatus for use with a resonator having at least one shuttle including a plurality of plates, the apparatus comprising:
a substrate having a plurality of electrode arrangements, each electrode arrangement including an acceleration sensor electrode and a pair of quadrature adjusting electrodes on opposite sides of the acceleration sensor electrode, each electrode arrangement capable of being overlaid by a corresponding plate of the at least one shuttle such that the plate completely overlays the acceleration sensor electrode and partially overlays the pair of quadrature adjusting electrodes on opposite sides of the acceleration sensor electrode such that capacitive coupling between the plate and each of the quadrature adjusting electrodes is dependent upon the position of the at least one shuttle while capacitive coupling between the plate and the acceleration sensor electrodes is substantially independent of the position of the at least one shuttle.

17. An apparatus according to claim 16, wherein the substrate further comprises at least one electrical connection for providing quadrature nullifying signals to the quadrature adjusting electrodes.

18. An apparatus according to claim 16, wherein each shuttle includes an outer rim suspended via a number of spokes from a central hub, and wherein the substrate further comprises:
at least one pair of quadrature adjusting electrodes on the substrate configured to be overlaid by the radial edges of a corresponding spoke of the at least one shuttle.

19. An apparatus according to claim 18, wherein the substrate further comprises at least one electrical connection for providing quadrature nullifying signals to the quadrature adjusting electrodes of the electrode arrangements and to the quadrature adjusting electrodes underlying the radial edges of the spokes.

20. An apparatus according to claim 16, wherein each electrode arrangement further includes a phase-compensating electrode.

21. An inertial sensor according to claim 1, wherein the at least one shuttle is configured to oscillate rotationally, and wherein capacitive coupling between the plate and each of the quadrature adjusting electrodes is dependent upon the rotational position of the at least one shuttle while capacitive coupling between the plate and the acceleration sensor electrodes is substantially independent of the rotational position of the at least one shuttle.

22. An inertial sensor according to claim 1, wherein the at least one shuttle is configured to oscillate translationally.

23. An apparatus according to claim 16, wherein the at least one shuttle is configured to oscillate rotationally, and wherein capacitive coupling between the plate and each of the quadrature adjusting electrodes is dependent upon the rotational position of the at least one shuttle while capacitive coupling between the plate and the acceleration sensor electrodes is substantially independent of the rotational position of the at least one shuttle.

24. An apparatus according to claim 16, wherein the at least one shuttle is configured to oscillate translationally.

25. An inertial sensor comprising:
 a shuttle arranged in a device plane and configured to oscillate in the device plane;
 at least one out-of-plane quadrature adjusting electrode configured such that capacitive coupling between the shuttle and each of the at least one quadrature adjusting electrode is dependent upon the position of the shuttle as it oscillates; and
 an out-of-plane acceleration sensor electrode configured such that capacitive coupling between the shuttle and each of the at least one quadrature adjusting electrode is substantially independent of the position of the shuttle as it oscillates.

26. An inertial sensor according to claim 25, wherein the shuttle is configured to oscillate rotationally, and wherein capacitive coupling between the plate and each of the quadrature adjusting electrodes is dependent upon the rotational position of the at least one shuttle while capacitive coupling between the plate and the acceleration sensor electrodes is substantially independent of the rotational position of the at least one shuttle.

27. An inertial sensor according to claim 25, wherein the at least one shuttle is configured to oscillate translationally.

* * * * *